United States Patent [19]
Zakhor et al.

[11] Patent Number: 5,699,121
[45] Date of Patent: Dec. 16, 1997

[54] METHOD AND APPARATUS FOR COMPRESSION OF LOW BIT RATE VIDEO SIGNALS

[75] Inventors: Avideh Zakhor, Berkeley; Ralph Neff, El Cerrito, both of Calif.

[73] Assignee: Regents of the University of California, Berkeley, Calif.

[21] Appl. No.: 532,324

[22] Filed: Sep. 21, 1995

[51] Int. Cl.⁶ .................................................. H04N 7/32
[52] U.S. Cl. ............................................ 348/417; 348/422
[58] Field of Search ................................. 348/401, 397, 348/402, 398, 409, 415, 416, 417, 418, 422, 414; 382/253, 236

[56] References Cited

U.S. PATENT DOCUMENTS

| | | | |
|---|---|---|---|
| 5,043,808 | 8/1991 | Knauer et al. | 348/417 |
| 5,272,529 | 12/1993 | Frederiksen | 348/422 |
| 5,371,544 | 12/1994 | Jacquin et al. | 348/422 |
| 5,444,488 | 8/1995 | Goubault et al. | 348/418 |

OTHER PUBLICATIONS

Mallat, et al., "Matching Pursuits With Time–Frequency Dictionaries", IEEE Transaction in Signal Processing, vol. 41, No. 12, Dec. 1993.

*Primary Examiner*—Amelia Au
*Attorney, Agent, or Firm*—Flehr Hohbach Test Albritton & Herbert LLP; William S. Galliani

[57] ABSTRACT

An apparatus and method to compress a video signal uses a motion compensated DCT (Discrete Cosine Transform) type approach. However, instead of relying upon a DCT coder to process a motion residual signal, the motion residual signal is processed by a pattern marcher. The pattern marcher identifies regions in the motion residual signal that have not been accurately reproduced on account of image motion. Each of these regions is compared to a set of library patterns in a pattern library. The pattern marcher links each region with a selected library pattern, which accurately characterizes the region. The pattern matcher forms an atom parameter signal characterizing each selected library pattern. The atom parameter signal is transmitted as a compressed version of the video signal. After transmission, the video signal is reconstructed from the atom parameter signal. In particular, a pattern fetcher is used to interpret the atom parameter signal to identify the selected library patterns used to characterize the motion residual signal. The selected library patterns are combined with other information to reconstruct the video signal.

22 Claims, 7 Drawing Sheets

METHOD AND APPARATUS FOR COMPRESSION OF LOW BIT RATE VIDEO SIGNALS

This invention was made with Government support under Grant (Contract) No. FD90-57466 awarded by the National Science Foundation, Grant (Contract) No. FDF49620-93-1-0370 awarded by the Air Force Office of Scientific Research, and Grant (Contract) No. FDN0014-92-J-1732 awarded by the Office of Naval Research. The Government has certain rights to this invention.

BRIEF DESCRIPTION OF THE INVENTION

This invention relates generally to the processing of video signals. More particularly, this invention relates to the processing of low bit rate video signals of the type that are used in personal video communication devices, such as video telephones and wireless communication systems.

BACKGROUND OF THE INVENTION

Recent advances in computer networks and signal compression technology have made point to point digital video communication possible. Applications for this new technology can be classified by the amount of bandwidth available for transmission. A broadcast quality video-on-demand system requires between 2 and 8 megabits per second (Mbits/s) for typical television sourced material. Commercially available vidoeconferencing systems typically use a few hundred kilobits per second (kbits/s) to represent several people moving and speaking independently. At the low end of the bandwidth scale is personal video communication. An example application of this technology is the "video telephone", which allows people to communicate using both moving video and sound. The actual medium for data transfer might be ordinary telephone lines, a wireless system, or a computer network. The bandwidth available for such systems is very restrictive, typically 20 kbits/s and below. The present invention is directed toward the processing of video signals at these low bit rates.

There are ongoing efforts to standardize digital video compression techniques. The majority of these efforts focus on high end applications. The MPEG 1 and 2 committees, for example, specified systems for transmitting data at rates of 1.4 Mbits/s and higher. Some attempts have been made to standardize lower end applications. For example the CCITT developed recommendation H.261 to function at multiples of 64 Kbits/s, and recommendation H.263 to function at still lower rates. All of these attempts at standardization use a technique known as motion compensated DCT. This technique uses a previous video frame to construct a current video frame, with only the difference in signal content between the two video frames being sent over the transmission channel. The difference in signal content is coded using the Discrete Cosine Transform (DCT). Unfortunately, such motion compensated DCT systems do not perform well at the very low bit rates needed for personal video communication. At these rates, the transmitted signal is represented with fewer significant DCT coefficients, each with a very coarse quantization. This results in noticeable distortion and visible block artifacts. Thus, it would be highly desirable to have a signal compression technique for low bit rate video signals that does not rely upon DCT coding and can otherwise avoid the distortion and visible block artifacts associated with DCT coding.

SUMMARY OF THE INVENTION

The invention is an improved apparatus and method to compress a video signal, particularly a low bit rate video signal. The technology is analogous to motion compensated DCT (Discrete Cosine Transform) techniques. However, instead of relying upon a DCT coder to process a motion residual signal, the motion residual signal is processed by a pattern matcher. The pattern matcher identifies regions in the motion residual signal that have not been accurately reproduced on account of image motion. Each of these regions is compared to a set of library patterns in a pattern library. The pattern matcher links each region with a selected library pattern, which accurately characterizes the region. The pattern matcher forms an atom parameter signal characterizing each selected library pattern. The atom parameter signal is transmitted as a compressed version of the video signal. After transmission, the video signal is reconstructed from the atom parameter signal. In particular, a pattern fetcher is used to interpret the atom parameter signal to identify the selected library patterns used to characterize the motion residual signal. The selected library patterns are combined with other information to reconstruct the video signal.

The method of the invention includes the steps of deriving a frame of a motion residual signal from a frame of a video signal. The highest energy pattern within the frame of the motion residual signal is then identified. The highest energy pattern is then compared to library patterns of a pattern library to identify a matched pattern. A set of variables are then assigned to characterize the matched pattern; the set of variables form an atom parameter signal segment. The foregoing steps are repeated to identify the highest energy patterns within the frame of the motion residual signal. Thereafter, the atom parameter signal segments are combined to form an atom parameter signal. The atom parameter signal is transmitted as a compressed video signal corresponding to the video signal.

Since the disclosed technology is not DCT based, it does not suffer the shortcomings associated with DCT systems operating at low bit rates. For example, with the present invention, the highest energy regions of a motion residual signal are processed first. Thus, only the most significant coefficients are used to characterize the image. This factor is especially significant at low bit rates. An overcomplete pattern library also improves the quality of the transmitted information at low bit rates since the overcomplete library can provide a more accurate representation of the selected pattern than is available by processing the original set of coefficients characterizing the selected pattern, as done in a DCT system.

In addition, by allowing patterns of the pattern library to overlap arbitrarily, the artificial block segmentation used in DCT-based systems is avoided. Further, since patterns can be selected to decay smoothly at the edges, basis edge artifacts are greatly reduced. As a result, the reconstructed image is more natural than comparable images generated by DCT-based systems.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
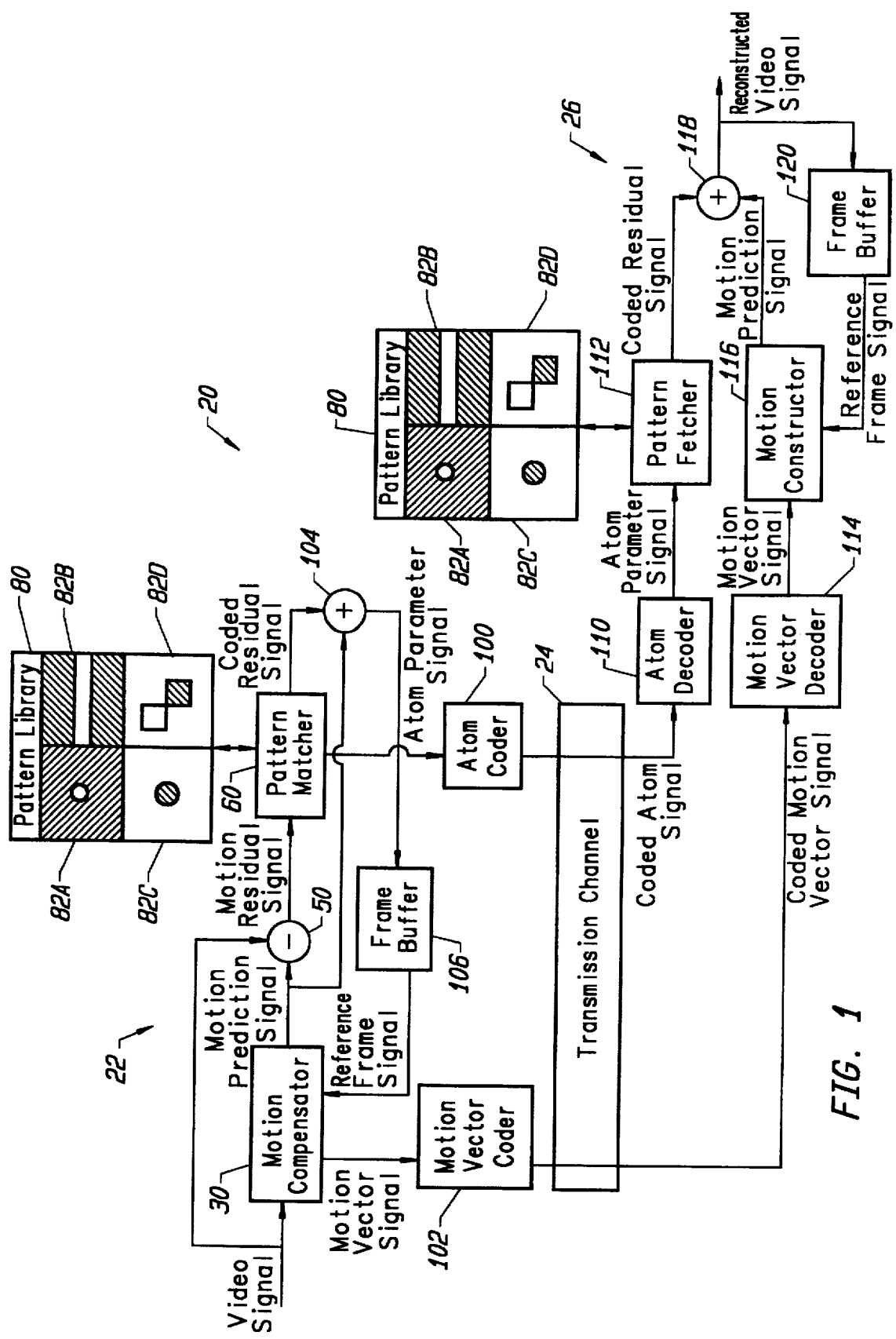
FIG. 1 illustrates the processing associated with one embodiment of the matching pattern video signal compression apparatus of the invention.

FIG. 1 illustrates the processing executed by a matching pattern video signal compression apparatus 20 constructed in accordance with one embodiment of the invention. The apparatus 20 includes a matching pattern coder 22 that receives an input video signal and generates a compressed video output signal. The compressed video output signal, specifically comprising a coded motion vector signal and a coded atom signal, is applied to a transmission channel 24, which may be a telephone line, a wireless communications frequency band, a computer network, or similar medium. The transmission channel 24 delivers the compressed video output signal to a matching pattern decoder 26. The matching pattern decoder 26 processes the compressed video output signal to generate a reconstructed video signal, which is subsequently processed in a conventional manner.

FIG. 1 illustrates that the video signal is initially processed by a motion compensator 30 of the matching pattern coder 22. A reference frame signal is also processed by the motion compensator 30. The reference frame signal 42 is the previous frame of the video signal. Instead of transmitting the entire current video frame signal over the transmission channel 24, the motion compensator 30 identifies those regions of the reference frame signal that can be used to construct the current video frame signal. That is, since the reference frame video signal has already been transmitted over the transmission channel 24, an attempt is made to use the transmitted information in constructing the current video frame signal. If this can be done, the only signal that needs to be transmitted over the transmission channel 24 is a signal identifying the region of the reference frame signal that can be used to construct the current frame signal and the difference between the reference frame signal and the current frame signal in that region.

Figure 2:
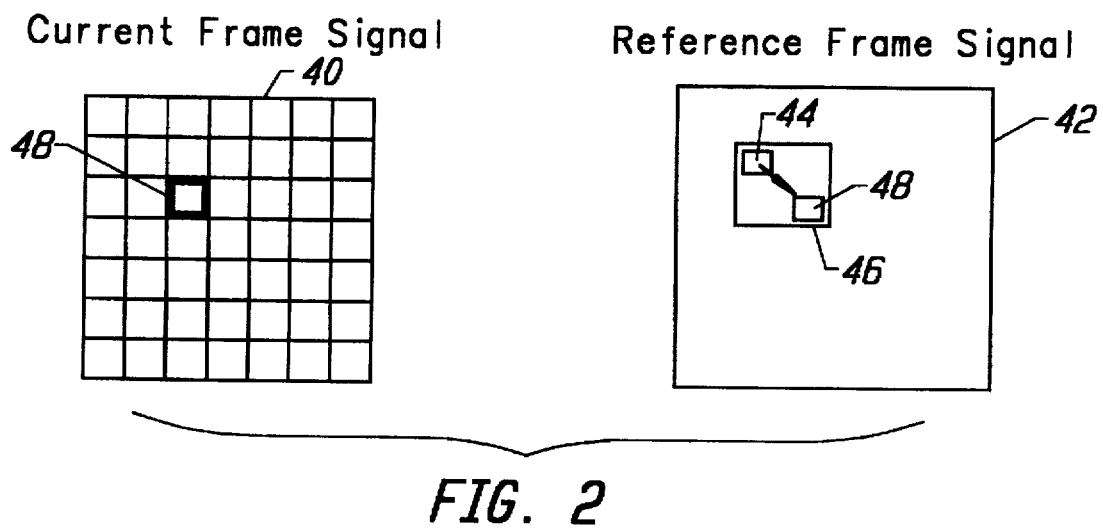
FIG. 2 graphically illustrates the process of obtaining a motion prediction signal and a motion vector signal.

This operation is more fully appreciated with reference to FIG. 2. The current frame signal 40 is divided into blocks. For each block 48 in the current frame signal 40, a search window 46 is created around the corresponding location in the reference frame signal 42. A search block 44 is moved within the search window 46 and the search block 44 location which most closely matches the block 48 in the current frame signal 40 is selected. This location is called a match block. The location of the match block relative to the original block is represented by a motion vector, represented in FIG. 2 by the arrow connecting match block 44 with the current frame block 48. The motion vectors for all the blocks in the current frame signal 40 are compiled into a motion vector signal. The motion vector signal is then transmitted over the transmission channel 24. At the decoder 26, this signal is used to move the search block 44 of the reference frame signal 42 to a position wherein it serves to accurately generate a portion of the current frame signal 40. This process is repeated for each region of the reference frame signal.

The motion compensator 30 also generates a motion prediction signal. The motion prediction signal characterizes the difference between the signal content of the search block 44 and the match block 48. The motion compensator 30 effectively subtracts the pixel values of the search block 44 from corresponding pixel values of the match block 48. If the resultant motion prediction signal has low values it is said to contain low "energy", indicating that there is a close match between the two signals. Conversely, if the resultant motion prediction signal has high values it is said to contain high "energy". A high energy signal is associated with motion between video frames.

Returning now to FIG. 1, illustrated therein is the motion vector signal and motion prediction signal leaving the motion compensator 30. The motion prediction signal is subtracted from the video signal at subtractor 50 to produce a motion residual signal. Thus, the motion residual signal is a signal representing those portions of the reference frame signal that are distinct from the current frame signal. In other words, the motion residual signal identifies high energy regions of the reference frame signal; the high energy regions indicate motion between frames that could not be compensated for by the motion compensator 30.

Figure 3:
FIG. 3 is an example of a motion residual signal frame processed in accordance with the invention.

FIG. 3 is an exemplary motion residual signal 52, more particularly, a frame of a motion residual signal. Note that the signal 52 has several high energy regions 54. The high energy regions 54 correspond to those regions of the video signal that are experiencing motion. It is seen in FIG. 3 that the eyes, mouth, hair, and shoulder regions of an individual have moved from one frame to the next.

In the prior art, a motion residual signal is processed by a DCT coder. Specifically, the motion residual signal is segmented into blocks of data, or pixel blocks, which can be represented by an N×N matrix. The matrix is then transformed to the DCT domain through a well-known mathematical operation. The mathematical operation results in an N×N matrix of coefficients. Since the input matrix is the same size as the output matrix, the DCT operation is said to operate on a "complete basis".

The present invention does not use a DCT coder. Instead, the motion residual signal is processed by a pattern matcher 60. The pattern marcher 60 accesses a pattern library 80, which includes a large number of signal patterns 82. The large number of signal patterns forms an "overcomplete basis" library, meaning that the input matrix of information applied to the pattern library can result in a larger output matrix of information. This approach stands in contrast to the "complete basis" used in the DCT domain. The benefit of the overcomplete basis library is that the coefficients used to characterize and code the selected input patterns are chosen from a large and diverse collection of functions. Thus, each coefficient is more effective in representing the true patterns in the residual signal. Since each coefficient is more effective, the residual signal can be coded with fewer significant coefficients, which is highly advantageous at low bit rates.

For the sake of simplicity, only four signal patterns 82A, 82B, 82C, and 82D are shown in FIG. 1. The pattern matcher 60 identifies high energy regions of the motion residual signal, called "input patterns". Each input pattern is then compared to the library patterns 82 of the pattern library 80. The closest library pattern 82 in the pattern library 80 is selected, and a weighting coefficient for this pattern is computed by a method described below. The specific pattern, the weighting coefficient, and the exact position of the pattern within the image describe an ˆatomʜ. This atom is used to represent a specific energy structure in the coded version of the motion residual signal. The same processing steps are then repeated for other high energy regions of the motion residual signal. The pattern matcher 60 outputs a coded residual signal which approximates the selected input patterns from the motion residual signal by using the selected atoms. This signal is effectively the coded version of the motion residual signal. The pattern marcher 60 also outputs a coded atom signal, which provides information on the selected atoms.

Figure 4:
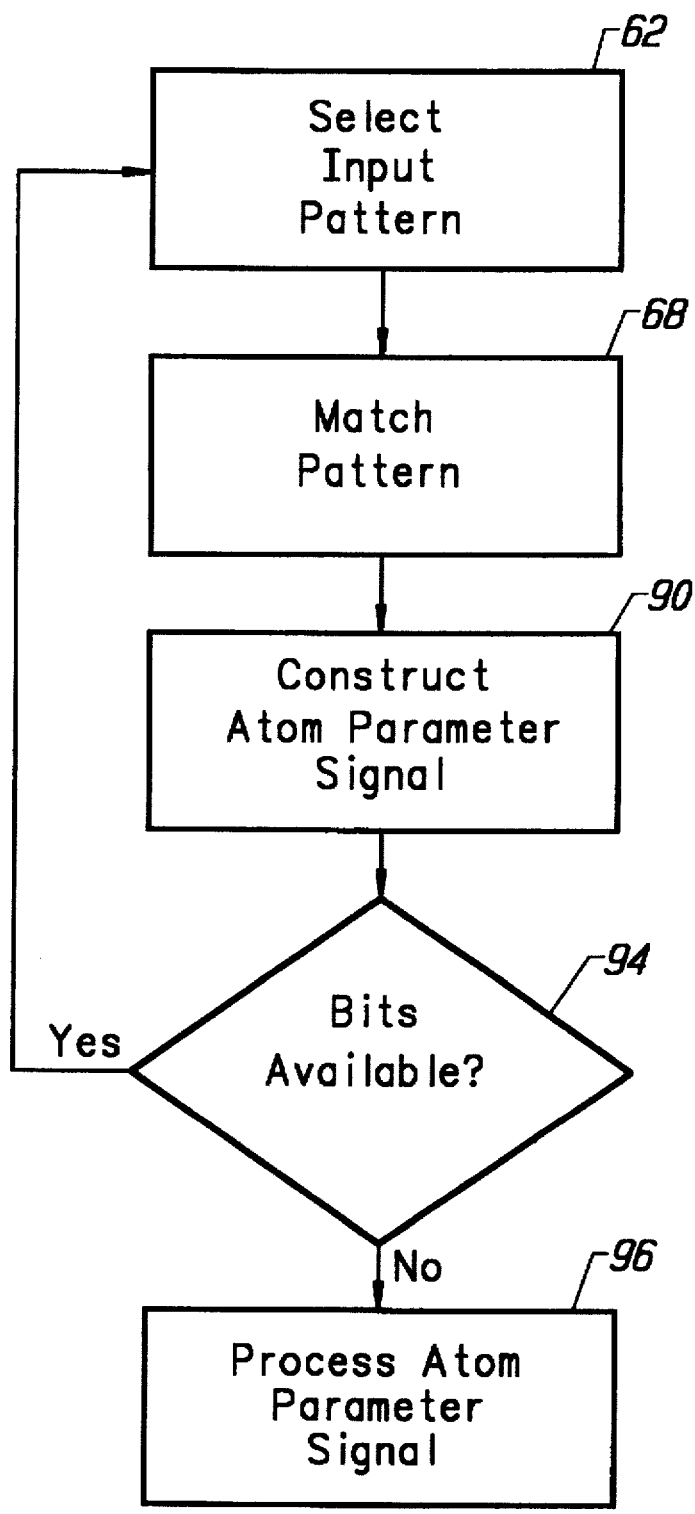
FIG. 4 illustrates one embodiment of the processing performed by an pattern matcher in accordance with the invention.
Figure 5:
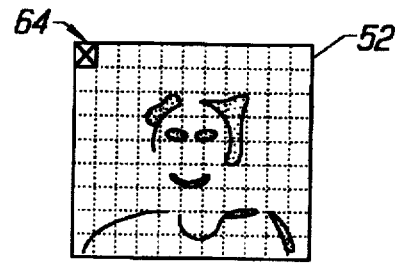
FIG. 5 illustrates the division of a motion residual signal frame for the purpose of finding high energy "patterns" within the signal.
Figure 6:
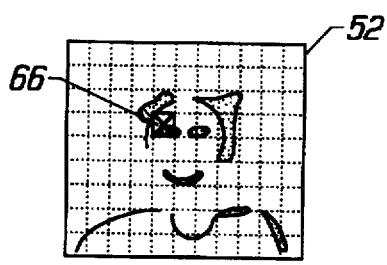
FIG. 6 illustrates the location of a selected pattern in a motion residual signal frame.
Figure 7:
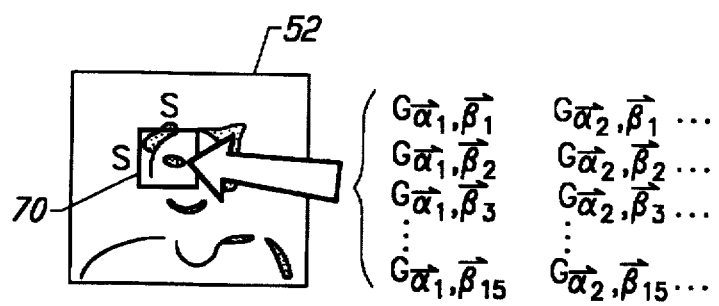
FIG. 7 illustrates a matching operation for the selected pattern of FIG. 6.

The operation of the pattern matcher 60 is more fully described in reference to FIG. 4. FIG. 4 illustrates the processing steps executed by the pattern marcher 60. The first processing step is to select an input pattern (block 62). This processing step requires the division of the motion residual signal into seek blocks 64, as shown in FIG. 5. The sum of the squares of all pixel intensities is computed for each seek block 64. The seek block with the largest value is adopted as a selected input pattern 66, as shown in FIG. 6. As shown in FIG. 7, an S×S window is then formed around the region of the selected input pattern.

This pre-processing of the motion residual signal frame signal is highly advantageous since it reduces the number of comparisons that must be made with the pattern library and it insures that the most problematic areas of the image are processed. Thus, the most significant coefficients associated with the image are transmitted to the destination site.

The next processing step associated with the pattern matcher 60 is to match a pattern (block 68). That is, the content of the S×S window is compared to the different patterns (G) of the pattern library 80 to find the closest match. In the simple example of FIG. 1, it can be seen that pattern 82C is the closest to the pattern of the S×S block of FIG. 7. Note that the matching procedure compares each pattern in the pattern library 80 to the content of the S×S search window at all possible locations within the window, and thus the exact position of the match must be recorded in addition to the specific pattern matched and the weighting coefficient.

Once the closest match is identified, an atom parameter signal segment is constructed (block 90). The atom parameter signal segment specifies the best match structure element from the pattern library 80. This element is identified with the values ($\alpha$, $\beta$). The atom parameter signal segment also specifies the location of the best match in the reference frame with (x, y) coordinates. Finally, the atom parameter signal segment specifies the projection of image data at (x, y) onto the selected match element, referred to as "p". That is, the best match element from the pattern library is multiplied by a value "p", as will be further described below.

Figure 8:
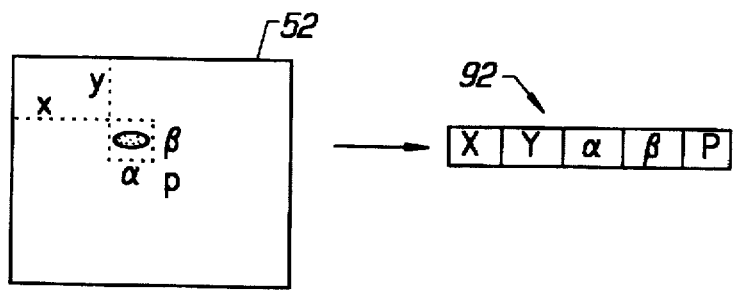
FIG. 8 illustrates parameters that may be used to construct an atom parameter signal.

These parameters are shown in FIG. 8. Their arbitrary arrangement into an atom parameter signal segment 92 is also illustrated in FIG. 8.

As shown in FIG. 4, if bits are still available (decision block 94), processing of another input pattern commences at block 62. That is, the processing of several high energy input patterns is executed to improve the quality of the reconstructed image at the high energy input pattern locations. When this processing is completed, the constructed atom parameter signal is processed (block 96).

The constructed atom parameter signal is processed by the pattern marcher 60 to form a coded residual signal. As indicated above, the coded residual signal corresponds to the motion residual signal, but has atoms substituted for the processed high energy input patterns. These atoms represent the energy structures in the motion residual signal and are used by the decoder to supplement the motion prediction signal when the reconstructed image is generated.

The atom parameter signal is also processed by passing it to an atom coder 100. Typically, the atom coder 100 will receive an atom parameter signal that includes information on a set of sequentially identified atoms.

The atom coder 100 performs known quantization and variable length coding operations. The quantization operation transforms the coefficients of the atom parameter signal into bits. The number of bits is a function of the rate and quality requirement of the video system. Variable length coding is then used to assign short bit patterns to signals with a high probability of occurrence and longer bit patterns to signals with a lower probability of occurrence. Thus, the throughput of the transmission channel 24 can be increased. Quantization and variable length coding operations are also performed on the motion vector signal by the motion vector coder 102.

The adder 104 of the matching pattern coder 22 combines the coded residual signal with the motion prediction signal to reconstruct the video signal. The video signal is then passed to a frame buffer 106 where it is stored until the next signal frame is available. When the next signal frame is available at the motion compensator 30, the reference frame signal from the frame buffer 106 is passed to the motion compensator 30 and processing is repeated.

The matching pattern decoder 26 performs operations which are the inverse of those performed by the matching pattern coder 22. In particular, the atom decoder 110 performs inverse variable length coding and quantization operations to recover the atom parameter signal. The atom parameter signal is then passed to the pattern fetcher 112. The pattern fetcher 112 uses the information in the atom parameter signal to identify a selected pattern in the pattern library 80. The selected pattern is then used to form a coded residual signal.

The motion vector decoder 114 also performs inverse variable length coding and quantization operations, in this case to recover the motion vector signal. The motion vector signal is applied to a motion constructor 116, which also receives a reference frame signal from a frame buffer 120. Thus, the motion constructor 116 moves regions of the reference frame signal in accordance with the instructions provided by the motion vector signal. The result of this processing is a motion prediction signal. The motion prediction signal is combined with the coded residual signal at adder 118 to generate a reconstructed video signal. The motion prediction signal provides the content for the portions of the video signal which are well represented by translating blocks from the reference frame, while the coded residual signal provides information about the video signal in regions where block translation fails.

Figure 9:
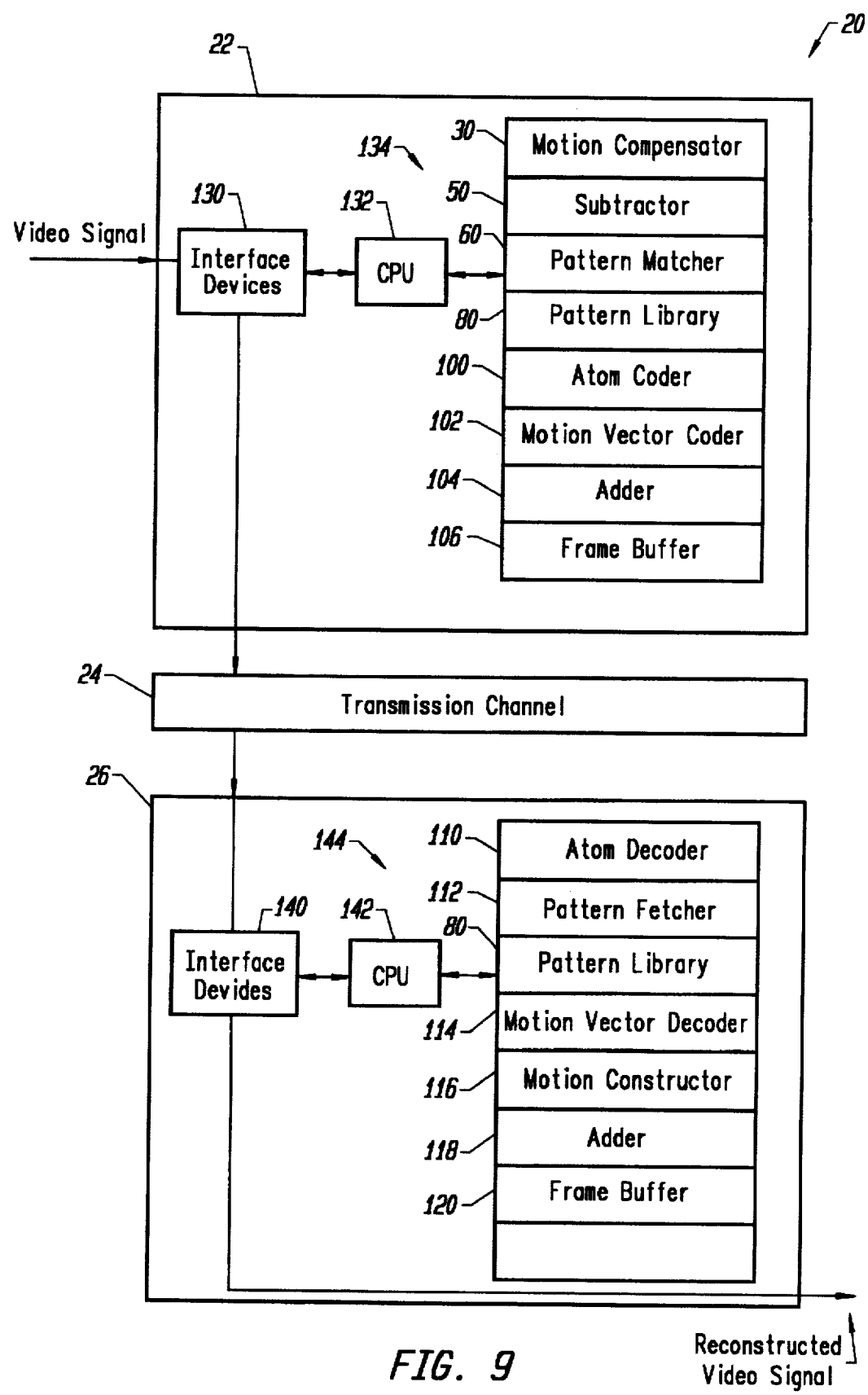
FIG. 9 illustrates the apparatus of FIG. 1 implemented in software.

FIG. 9 illustrates the apparatus of FIG. 1 implemented in software. In particular, the figure illustrates a video signal being applied to a matching pattern coder 22, which includes interface devices 130. The interface devices 130 include physical connections and signal conversion circuitry required for communication with a central processing unit (CPU) 132. The CPU 132 is connected to a memory 134, which includes a set of stored programs and data. For example, one program is the motion compensator 30. This program is a set of executable instructions used to achieve the previously described functions. Similar executable programs are provided for the subtractor 50, the pattern matcher 60, the atom coder 100, the motion vector coder 102, and the adder 104. The pattern library 80 is stored in memory 134. In addition, there is space in the memory 134 for the frame buffer.

The configuration of the matching pattern coder 22 of FIG. 9 is simplified for illustrative purposes. A preferable embodiment has the pattern library 80 and frame buffer 106 implemented addition, the executable program In addition, the executable programs are preferably embedded in silicon. Thus, for example, the motion compensator 30 and pattern matcher 60 are implemented as separate integrated circuits.

After processing by the CPU 132, the video signal is applied to the interface devices 130, which are used to pass the coded atom signal and coded motion vector signal to the transmission channel 24. The matching pattern decoder 26 of FIG. 9 has a similar construction and operates under similar principals as those used by the matching pattern coder 22.

The invention has now been fully described. Attention presently turns to implementation details associated with the disclosed technology. As indicated above, the pattern matcher 60 matches selected input patterns with patterns in a pattern library. Preferably, the pattern matcher 60 executes a "matching pursuits algorithm". The "matching pursuits algorithm" is described by S. Mallat and Z. Zhang, in "Matching Pursuits with Time-Frequency Dictionaries", IEEE Transactions in Signal Processing, Vol. 41, No. 12, Dec. 1993. The matching pursuits algorithm expands a signal using an overcomplete basis of Gabor functions. The functions are scaled, shifted, and modulated versions of a Gaussian window function.

A prototype window g(t) is defined as:

$$g(t) = \sqrt[4]{2}\, e^{-\pi t^2} \tag{1}$$

This is a Gaussian function of unit norm. The triple $\vec{\gamma} = (s, u, \xi) \in R^+ \times R \times R$ is defined where R is the set of all real numbers and $R^+$ is the set of positive reals. Here s represents a positive scale value, u is a time shift, and $\xi$ is a modulation frequency. The Gabor basis set consists of all $g_{\vec{\gamma}}(t)$ defined by:

$$g_{\vec{\gamma}}(t) = \frac{1}{\sqrt{s}}\, g\left(\frac{t-u}{s}\right) e^{i\xi t} \tag{2}$$

An expansion is commenced by matching the signal f(t) to the most appropriate basis function $g_{\vec{\gamma}}(t)$ in the dictionary. In other words, a selected input pattern 66 (f(t)) is matched with the most appropriate pattern 82 ($g_{\vec{\gamma}}(t)$) in the pattern library 80. This is accomplished by choosing $\vec{\gamma}$ to maximize the absolute value of the following inner product:

$$p = \langle f(t), g_{\vec{\gamma}}(t)\rangle \tag{3}$$

As known in the art, an inner product can be alternately defined as:

$$p = \int_{-\infty}^{\infty} f(t) g(t) dt \tag{3a}$$

Since discrete pixels are being processed, the inner product is more accurately defined as:

$$p = \sum_{k=-\infty}^{\infty} f(t) g(t) \tag{3b}$$

The term p is then used as an expansion coefficient for the signal onto the dictionary function $g_{\vec{\gamma}}(t)$. A residual signal is computed as:

$$R(t) = f(t) - p g_{\vec{\gamma}}(t) \tag{4}$$

Equation (4) indicates that the matched pattern from the pattern library is multiplied by the coefficient p. The resultant product is subtracted from the motion residual signal f(t) so that processing of the remaining high energy patterns can proceed.

This procedure continues iteratively until either a set number of expansion coefficients are generated or some energy threshold for the residual is reached. Each of the M stages yields a dictionary structure specified by $\vec{\gamma}_n$, an expansion coefficient $p_n$, and a residual $R_n$ which is passed on to the next stage. This signal can then be approximated by a linear function of the dictionary elements:

$$f(t) \approx \sum_{n=1}^{M} p_n g_{\vec{\gamma}_n}(t) \tag{5}$$

Equation five indicates that the atoms identified in the processing of the high energy input patterns are combined to reconstruct the motion residual signal. Note that the M dictionary structures $g_{\vec{\gamma}n}(t)$ are not necessarily orthogonal. The approximation in Equation 5 generally improves as M is increased.

The pattern library 80 consists of discrete 2-D basis functions (library patterns 82). Since the matching pursuit technique requires exhaustive inner-product searches in the library 80, the library 80 must be limited to a reasonable number of library patterns 82, each with a finite spatial extent. To reduce the search time, each basis function 82 should be separable. To meet these requirements, a separable product of real, discrete Gabor functions with N×N support is defined. These are based on 1-D sequences of length N:

$$g_{\vec{\alpha}}(i) = K_{\vec{\alpha}} \cdot g\left(\frac{i - \frac{N}{2} + 1}{s}\right) \cdot \cos\left(\frac{2\pi\xi\left(i - \frac{N}{2} + 1\right)}{N} + \phi\right) \tag{6}$$

$i \in \{0, 1, \ldots N-1\};$ where g(t) is the prototype Gaussian window from Equation 1, and $\vec{\alpha} = (s, \xi, \phi)$ is a triple consisting respectively of a positive scale, a modulation frequency, and a phase shift. B is defined to be the set of all such triples. The constant $K_{\vec{\alpha}}$ is chosen such that the resulting sequence is of unit norm. Also, the index i is shifted by (N/2−1) to effectively center the Gaussian envelope and allow the resulting sequence to decay smoothly at both edges. Sequences as defined by Equation 6 may be used to separably construct 2-D discrete functions with N×N support. A dictionary set may be composed of these 2-D structures:

$$G_{\vec{\alpha},\vec{\beta}}(i,j) = g_{\vec{\alpha}}(i) g_{\vec{\beta}}(j) \quad i,j \in \{0,1,\ldots,N-1\} \quad \vec{\alpha},\vec{\beta} \in \beta \tag{7}$$

Figure 10:
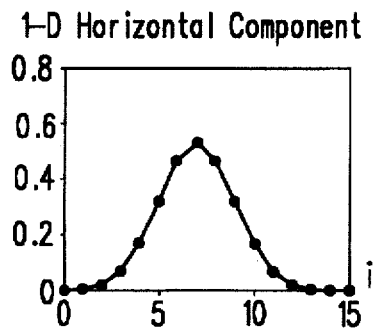
FIG. 10 illustrates the horizontal component of a sample library pattern.
Figure 11:
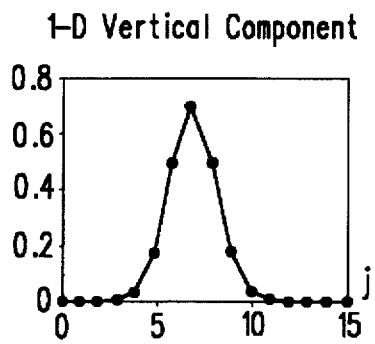
FIG. 11 illustrates the vertical component of a sample library pattern.
Figure 12:
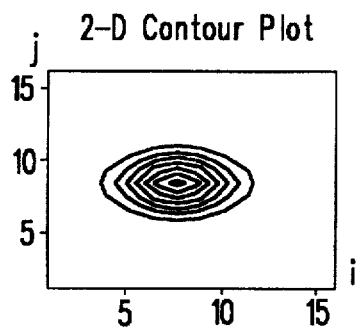
FIG. 12 illustrates a contour plot of a sample library pattern.
Figure 13:
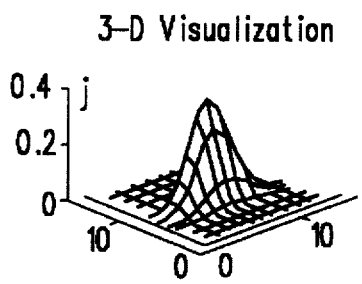
FIG. 13 illustrates a 3-dimensional visualization of a library pattern element corresponding to FIGS. 10–12.

Examples of the structures defined in Equations 6 and 7 are shown in FIGS. 10–13. FIG. 10 shows the 1-D horizontal component $g_{\vec{\alpha}}(i)$ with $\vec{\alpha}=(5,0,0)$. FIG. 11 shows the 1-D vertical component $g_{\vec{\beta}}(j)$ with $\vec{\beta}=(3,0,0)$. A contour plot of the resulting 2-D basis structure $G_{\vec{\alpha},\vec{\beta}}(i,j)$ is shown in FIG. 12, and a 3-D visualization of the structure is shown in FIG. 13. This structure is completely specified by $\vec{\alpha}$ and $\vec{\beta}$.

The matching pursuit technique is preferably used to match the pattern library of such structures to energy patterns in the motion residual signal. During the matching operation, the structure is centered at any integer-pixel location in the image. The result is a large, diverse basis set. Note that unlike the DCT technique, this technique is not block based.

To keep the search time reasonable, the dictionary size is limited. Preferably, the dictionary set is defined to include all $G_{\vec{\alpha},\vec{\beta}}(i,j)$ with $\vec{\alpha}, \vec{\beta} \in B'$, where B' is a finite subset of B.

To keep the search time reasonable, the dictionary size is limited. Preferably, the dictionary set is defined to include all $G_{\vec{\alpha},\vec{\beta}}(i,j)$ with $\vec{\alpha}, \vec{\beta} \in B'$, where B' is a finite subset of B.

The reduced dictionary set B' is constructed in the following manner. A large subset of B containing evenly spaced instances of the three parameters (s, ξ, φ) is used to define a 2-D dictionary with N=16. A set of motion residual images from a training sequence is then decomposed on this dictionary using matching pursuits. The fifteen parameter triples which are most often selected by the matching algorithm are retained in a reduced set, denoted B'. This set is shown in Table 1.

algorithm requires an exhaustive computation of the inner product of each structure in the dictionary with all possible N×N regions in the residual image. In order to reduce this search to a manageable level, assumptions are made about the residual image to be coded. Specifically, it is assumed that the image is sparse, containing pockets of energy at locations where the motion prediction model was inadequate, for example, as shown in FIG. 3. As indicated previously, this sparse image is processed, or "pre-scanned", to identify selected patterns representing high-energy pockets.

Once a pattern is identified, each N×N dictionary structure is centered at each location in the S×S search window, and the inner product between the structure and the corresponding N×N region of image data is computed. Computation time is reduced by the fact that dictionary structures are separable. The largest inner product, along with the corresponding dictionary structure and image location, form the five parameters of FIG. 8:

| | |
|---|---|
| $\vec{\alpha}, \vec{\beta}$ | Best match structure element from dictionary |
| x, y | Location of best match in residual image |
| p | Value of largest inner product; |
| | Projection of image data at (x,y) onto $G_{\vec{\alpha},\vec{\beta}}(i,j)$ |

As previously indicated, these five parameters define an atom, a coded structure within the motion residual signal image. When an atom is found, it is

TABLE 1

| Dictionary Triples, $\vec{\alpha}_i = (s_i, \xi_i, \phi_i) \in \beta'$ | | | | | | | | | | | | | | | |
|---|---|---|---|---|---|---|---|---|---|---|---|---|---|---|---|
| i | 1 | 2 | 3 | 4 | 5 | 6 | 7 | 8 | 9 | 10 | 11 | 12 | 13 | 14 | 15 |
| $s_i$ | 1 | 3 | 5 | 7 | 9 | 100 | 1 | 5 | 100 | 4 | 4 | 8 | 4 | 4 | 4 |
| $\xi_i$ | 0 | 0 | 0 | 0 | 0 | 0 | 1 | 1 | 1 | 2 | 3 | 3 | 4 | 2 | 4 |
| $\phi_i$ | 0 | 0 | 0 | 0 | 0 | 0 | π/2 | π/2 | π/2 | 0 | 0 | 0 | 0 | π/4 | π/4 |

The dictionary defined by the triples in Table 1 is much larger than the standard block-DCT basis. To see this, consider the decomposition of a 176×144 pixel image. An 8×8 pixel block-DCT basis must represent the image using a set of 64 2-D basis functions, each of which can be placed at 396 possible block locations in the image. This defines a DCT dictionary containing 25344 basis structures. The matching pursuit dictionary defined above uses 225 2-D functions, each with 176×144 possible image locations. This set contains 5.7 million basis structures. More importantly, the structures in the matching pursuit basis do not conform to artificial block shapes or grid locations. The various scale parameters $s_i$ used in Table 1 produce structures in a variety of sizes and shapes. These are then matched to similar structures at all possible locations in the motion residual image.

A dictionary of 2-D structures which will be used to decompose motion residual images using matching pursuits has been defined. A direct extension of the matching pursuit $$\begin{array}{ll} G_{\vec{\alpha}_1,\vec{\beta}_1} & G_{\vec{\alpha}_2,\vec{\beta}_1} \cdots \\ G_{\vec{\alpha}_1,\vec{\beta}_2} & G_{\vec{\alpha}_2,\vec{\beta}_2} \cdots \\ G_{\vec{\alpha}_1,\vec{\beta}_3} & G_{\vec{\alpha}_2,\vec{\beta}_3} \cdots \\ \cdot & \cdot \\ \cdot & \cdot \\ \cdot & \cdot \\ G_{\vec{\alpha}_1,\vec{\beta}_{15}} & G_{\vec{\alpha}_2,\vec{\beta}_{15}} \cdots \end{array} \tag{8}$$

subtracted from the image to form the next stage residual. This corresponds to Equation 4 for the 1-D case. This residual is passed to the next coding stage, and the search process for the next high energy input pattern is repeated. The original motion error image is thus approximated as a summation of individual atoms.

One of the main benefits of the pattern marcher 60 of the invention is that, unlike a DCT coder, it is not block based. Still, some block artifacts from the motion model can be found in the reconstructed sequence. In an attempt to eliminate these effects, a smoother motion model using overlapping blocks is preferably used. For instance, a 16×16 sine-squared window may be used.

$$w(i) = \sin^2\left(\frac{\pi(i+1/2)}{16}\right) \quad (9)$$

$$W(i,j) = w(i) \cdot w(j), \quad i,j \in \{0,1,\ldots 15\} \quad (10)$$

This window decays smoothly at the edges, providing a more continuous motion estimate than a rectangular motion window. A rectangular window may be used to compute the motion vectors in a standard manner, but the smoother 16×16 window is employed to predict the current frame from these vectors and a previous frame reconstruction. A 16×16 block of data from the previous reconstruction is weighted by the sine-squared window and added to other such blocks on an overlapping 8×8 pixel grid. This produces a much smoother motion prediction without adding significant computation to the coding procedure. It is possible to improve the prediction even further by using the overlapping window to compute the motion vectors. The foregoing description assumes an 8×8 pixel based motion grid.

The present invention was implemented by replacing the DCT residual coder in an SIM3 system with the pattern matcher 60. As known in the art, the SIM3 low bit rate coding model was developed by the European COST211ter project. It is a hybrid DCT coding system designed to run at very low bit rates. The system uses the QCIF format in which each frame consists of a 176×144 pixel luminance image and two 88×72 pixel chrominance images. Frames are partitioned into macroblocks, each consisting of four 8×8 luminance blocks and two 8×8 chrominance blocks. A macroblock thus represents a 16×16 pixel block of luminance, and a QCIF image contains a total of 99 macroblocks.

SIM3 uses a block translational motion model to predict the current frame from a previous reconstruction. A motion search at integer resolution is performed as a first estimate using 16×16 pixel motion blocks. The estimate is refined by a ±half-pixel search about the integer position, and a decision function is employed to determine whether the 16×16 motion block should be divided into four 8×8 blocks. Motion vectors are coded differentially using variable length codewords for each component.

The model includes a simple buffering system which drops frames adaptively to prevent buffer overflow. Each time a frame is coded, the number of bits used is added to the buffer. This generally puts the buffer above a threshold T and causes the system to enter a waiting state. At the onset of each input frame, a number of bits equal to the target bit rate in bits/s divided by the input frame rate in frames/s is subtracted from the buffer and the resulting buffer content is compared to the threshold T. If the buffer contains more than T bits, the current frame is not coded. If fewer than T bits are in the buffer, the frame is coded and bits are again added to the buffer. Between the quantizer adjustment and the buffering system, the target bit rate and frame rate are approximately met.

As previously indicated, the image format used in SIM3 is QCIF, consisting of 176×144 pixel luminance image and two 88×72 pixel chrominance images. Color atoms were coded by the disclosed search method. The previously described pre-screening procedure was performed on each of the three image components, and the energy totals for blocks from the chroma subimages were weighted by an adjustable constant C. The largest block energy total from the three subimages was then used as an estimate for the S×S exhaustive search. The atoms associated with each of the three subimages were grouped together and coded, as described above, and further described below.

The initial 16×16 pixel search at integer resolution was performed using chrominance pixels as well as luminance. Each subsampled chrominance pixel was weighted equally with each luminance pixel in the sum-of-absolute-difference metric used in the motion search. The modification tends to reduce color artifacts by using more of the available information to compute the motion vectors.

The smooth motion model was paired with the matching pursuit coding system. The controller computes a target bit budget F for each coded frame by dividing the target bit rate by the target frame rate. When frame number k is coded, the motion field is computed and coded first, requiring $m_k$ bits. This leaves approximately $f=F-m_k$ bits with which to code the motion residual image. The residual is coded using a total of $M_k$ atoms where $M_k$ is computed as:

$$M_k = \frac{\hat{r}_k}{a_{k-1}} \quad (11)$$

and $a_{k-1}$ is the average number of bits used to code an atom in the previous frame. The actual residual budget, $r_k$ is the number of bits used to code the $M_k$ atoms. This value cannot be computed exactly until all $M_k$ atoms have been found. When all atoms have been coded, both $m_k$ and $r_k$ are added to the buffer, which is identical to the SIM3 buffering system.

The separable nature of the dictionary structures can be used to reduce the inner product search time significantly. To illustrate this, consider the task of finding the largest inner product in an S×S search window on a dictionary composed of B 1-D basis elements, each of length N. Ignoring separability altogether, the task requires one to compute $B^2$ full 2-D inner products at each of $S^2$ locations in the search window. Since each inner product is over an N×N pixel region, the total number of multiply-accumulate operations required is $S^2B^2N^2$. With the values S=16, B=15, and N=16, finding a single atom takes a total of 14.7 million operations.

The separable basis set can be exploited to reduce this search time. Consider the 2-D inner product between a basis structure $G_{\vec{\alpha}}\vec{\beta}(i,j)$ and an image patch I(i,j). Since G is separable, the inner product can be written as:

$$\sum_{i=1}^{N}\sum_{j=1}^{N} G_{\vec{\alpha}\vec{\beta}}(i,j) \cdot I(i,j) = \sum_{i=1}^{N} g_{\vec{\alpha}}(i) \sum_{j=1}^{N} g_{\vec{\beta}}(j) \cdot I(i,j) \quad (12)$$

Figure 14:
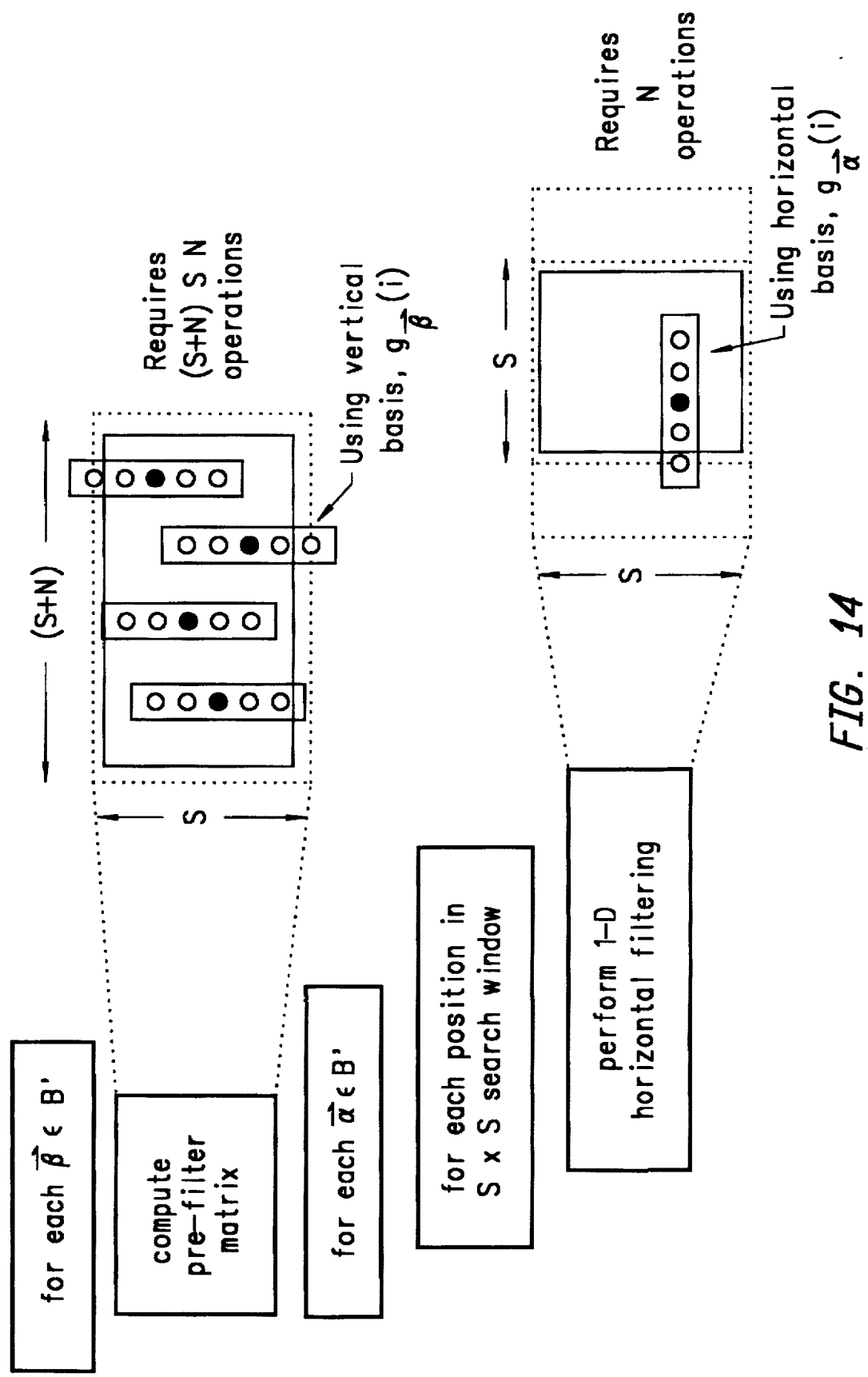
FIG. 14 illustrates a search algorithm that may be used in conjunction with the invention.

This is equivalent to performing N 1-D vertical inner products using $g_{\vec{\beta}}(j)$ and performing a single 1-D horizontal inner product between the resulting vector and $g_{\vec{\alpha}}$. The atom search requires an exhaustive computation of the inner product at each location using all combinations of $\vec{\alpha}$ and $\vec{\beta}$. It is thus natural to precompute the necessary vertical 1-D inner products with a particular $g_{\vec{\beta}}$, and then cycle through the horizontal 1-D inner products using all possible $g_{\vec{\alpha}}$. Furthermore, the results from the 1-D vertical pre-filtering also apply to the inner products at adjoining locations in the search window. This motivates the use of a large "prefiltering matrix" to store all the 1-D vertical filtering results for a particular $g_{\vec{\beta}}$. The resulting search algorithm is shown in FIG. 14. The operation count for finding a single atom is thus $BSN(S+N)+B^2S^2N$. Using the same set of nominal values, 1.04 million operations are required to find each atom.

A few refinements can reduce search complexity. For example, 1-D basis elements with small scale values are essentially zero over much of their support. The search algorithm can be modified to compute inner products using only the significant "non-zero" region of each basis function. Parallelism can also be exploited. As an example, if B processing units are available, each can be assigned the computation of the vertical pre-filter matrix corresponding to one of the $g_\beta(j)$. This increases the speed of the search algorithm by a factor of B.

The following quantization and variable length coding techniques were used when implementing the invention. The positions (x,y) were specified with adaptive Huffman codes derived from the previous ten frames worth of position data. Since position data from previous frames is available at the decoder, no additional bits need be sent to describe the adaptation. One group of codewords specifies the horizontal displacement of the first atom on a position line. A second group of codes indicates the horizontal distance between atoms on the same position line, and also contains 'end-of-line' codes which specify the vertical distance to the next active position line. The other parameters were coded using fixed Huffman codes based on statistics from training sequences. The basis structure was specified by horizontal and vertical components $\vec{\alpha}$ and $\vec{\beta}$ each of which is represented by an index equivalent to i in Table 1. Two code tables were used, one for the horizontal indices and one for the vertical. The continuous projection values p were quantized using a fixed linear quantizer. A variable length code specified the quantizer level, and a single bit was added for the sign.

Those skilled in the art will recognize a number of advantages associated with the disclosed technology. Initially, the system is not DCT based, and therefore does not suffer the shortcomings associated with DCT systems operating at low bit rates. In addition, by allowing functions to overlap arbitrarily, the artificial block segmentation used in DCT-based systems is avoided. Further, since functions can be selected to decay smoothly at the edges, basis edge artifacts are greatly reduced. As a result, the reconstructed image is more natural than comparable images generated by DCT-based systems.

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, the Gabor basis set disclosed herein provides good results, but it is not necessarily optimal. The disclosed matching pursuit routine will function with any arbitrary set of 2-D basis functions. It is possible that a different set of bases will provide better results for specific classes of input sequences.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A method of compressing a video signal, said method comprising the steps of:

deriving a motion residual signal from said video signal;

identifying a selected input pattern within said motion residual signal;

comparing said selected input pattern to library patterns of a pattern library to identify a matched pattern, said comparing step including the step of comparing said selected input pattern to library patterns which form an overcomplete basis such that there are more library patterns than coefficients used to characterize said selected input pattern; and transmitting information characterizing said matched pattern as a compressed video signal corresponding to said video signal.

2. The method of claim 1 wherein said deriving step includes the steps of:

forming a motion prediction signal from said video signal; and subtracting said motion prediction signal from said video signal to derive said motion residual signal.

3. The method of claim 2 wherein said deriving step further includes the step of:

deriving a motion vector signal from said video signal, said motion vector signal forming a portion of said compressed video signal.

4. The method of claim 1 wherein said step of identifying a selected input pattern includes the step of identifying a selected input pattern with high energy content indicative of motion in the image of said video signal.

5. The method of claim 1 wherein said comparing step includes the step of comparing said selected input pattern to library patterns with smoothly terminating edges.

6. The method of claim 1 further comprising the step of analyzing said compressed video signal at a remote destination to reconstruct said selected input pattern from said information characterizing said matched pattern.

7. A method of compressing a video signal, said method comprising the steps of:

(A) deriving a frame of a motion residual signal from a frame of said video signal;

(B) identifying the highest energy pattern within said frame of said motion residual signal;

(C) comparing said highest energy pattern to library patterns of a pattern library to identify a matched pattern;

(D) assigning a set of variables to characterize said matched pattern, said set of variables forming an atom parameter signal segment;

(E) removing said highest energy pattern from said frame of said motion residual signal;

(F) repeating steps (B) through (E) to identify a set of highest energy patterns within said frame of said motion residual signal;

(G) combining atom parameter signal segments to form an atom parameter signal; and (H) transmitting said atom parameter signal as a compressed video signal corresponding to said video signal.

8. The method of claim 7 wherein said deriving step includes the steps of:

forming a motion prediction signal from said video signal; and subtracting said motion prediction signal from said video signal to derive said motion residual signal.

9. The method of claim 8 wherein said deriving step further includes the step of:

deriving a motion vector signal from said video signal, said motion vector signal forming a portion of said compressed video signal.

10. The method of claim 7 wherein said comparing step includes the step of comparing said high energy pattern to library patterns with smoothly terminating edges.

11. The method of claim 7 further comprising the step of reconstructing said set of highest energy patterns of said motion residual signal with information from said atom parameter signal.

12. An apparatus for processing a video signal, said apparatus comprising:

a motion compensator to receive a video signal and generate a motion prediction signal;

a subtractor to subtract said motion prediction signal from said video signal to generate a motion residual signal;

a memory storing a set of library patterns forming a pattern library representing an overcomplete basis such that there are more library patterns than coefficients used to characterize an input pattern; and a pattern matcher connected to said memory and said subtractor to receive said motion residual signal and identify a high energy pattern in said motion residual signal, compare said high energy pattern to said set of library patterns to identify a matched pattern, assigning a set of values to characterize said matched pattern, said set of values forming an atom parameter signal segment, and transmit said atom parameter signal segment as a compressed video signal corresponding to said video signal.

13. The apparatus of claim 12 wherein said motion compensator generates a motion vector signal from said video signal, said motion vector signal forming a part of said compressed video signal.

14. The apparatus of claim 12 further comprising:

a second memory storing said set of library patterns forming said pattern library; and a pattern fetcher to receive said compressed video signal, and compare said set of values to said library patterns of said second memory to reconstruct said high energy pattern of said motion residual signal.

15. The apparatus of claim 12 wherein said memory stores a set of library patterns with smoothly terminating edges.

16. The apparatus of claim 12 wherein said memory stores a set of overlapping library patterns.

17. The apparatus of claim 12 wherein said pattern matcher uses the following values to characterize said matched pattern:

$\alpha$ and $\beta$ to specify a library pattern in said pattern library; and x and y to characterize the position of said high energy pattern in said motion residual signal.

18. The apparatus of claim 12 further comprising an atom coder connected to said pattern matcher to receive said atom parameter signal segment, quantize said atom parameter signal segment to form a quantized signal, and variable length encode said quantized signal to form said compressed video signal.

19. A method of compressing a video signal, said method comprising the steps of:

(A) deriving a frame of a motion residual signal from a frame of said video signal;

(B) comparing a selected input pattern within said motion residual signal to a set of arbitrarily overlapping basis functions to identify a matched pattern;

(C) assigning a set of variables to characterize said matched pattern, said set of variables forming an atom parameter signal segment;

(D) removing said selected input pattern from said frame of said motion residual signal;

(E) repeating steps (B) through (D) to identify a set of atom parameter signal segments;

(F) combining said set of atom parameter signal segments to form an atom parameter signal; and (G) transmitting said atom parameter signal as a compressed video signal corresponding to said video signal.

20. The method of claim 19 wherein said comparing step includes the step of defining said set of arbitrarily overlapping basis functions as library patterns of a pattern library.

21. The method of claim 20 wherein said comparing step includes the step of utilizing an overcomplete basis pattern library such that there are more library patterns than coefficients used to characterize said selected input pattern.

22. The method of claim 20 wherein said comparing step includes the step of comparing said selected input pattern to library patterns with smoothly terminating edges.

* * * * *